United States Patent
Shenkler (10) Patent No.: US 10,991,399 B2
(45) Date of Patent: Apr. 27, 2021

(54) ALIGNMENT OF ALTERNATE DIALOGUE AUDIO TRACK TO FRAMES IN A MULTIMEDIA PRODUCTION USING BACKGROUND AUDIO MATCHING

(71) Applicant: Deluxe One LLC, Burbank, CA (US)

(72) Inventor: Andrew Shenkler, Playa Vista, CA (US)

(73) Assignee: DELUXE ONE LLC, Burbank, CA (US)

( * ) Notice: Subject to any disclaimer, the term of this patent is extended or adjusted under 35 U.S.C. 154(b) by 0 days.

(21) Appl. No.: 16/377,920

(22) Filed: Apr. 8, 2019

(65) Prior Publication Data

US 2019/0311745 A1 Oct. 10, 2019

Related U.S. Application Data

(60) Provisional application No. 62/654,308, filed on Apr. 6, 2018.

(51) Int. Cl.
*G11B 27/10* (2006.01)
*G11B 27/02* (2006.01)
(Continued)

(52) U.S. Cl.
CPC .......... *G11B 27/10* (2013.01); *G06F 16/7834* (2019.01); *G10L 21/0272* (2013.01); *G11B 27/02* (2013.01)

(58) Field of Classification Search
CPC ..... G11B 27/10; G11B 27/02; G06F 16/7834; G10L 21/0272; G10L 15/265; H04N 21/4321; H04N 21/4307; H04N 21/8106

(Continued)

(56) References Cited

U.S. PATENT DOCUMENTS 5,040,081 A   8/1991  Mccutchen
5,055,939 A   10/1991 Karamon et al.
(Continued)

FOREIGN PATENT DOCUMENTS

EP   0890171 A1   1/1999

OTHER PUBLICATIONS

"International Search Report and Written Opinion", dated Aug. 20, 2019, in PCT Application No. PCT/US2019/026356 (18 pages).

(Continued)

*Primary Examiner* — Thai Q Tran
*Assistant Examiner* — Jose M Mesa
(74) *Attorney, Agent, or Firm* — Dorsey & Whitney LLP (57) ABSTRACT

A computer-implemented audio alignment system includes a storage device and a processor. The storage device is configured to ingest and store video files, which each include one or more respective audio soundtracks. The processor is configured to receive an alternate audio file associated with one of the video files. The alternate audio file includes an alternate audio soundtrack with dialogue and non-dialogue audio. The video file includes an original language audio soundtrack with dialogue and non-dialogue audio. The processor aligns the non-dialogue audio from the alternate audio soundtrack with the non-dialogue audio from the original language audio soundtrack and aligns the alternate audio soundtrack with the film based on the alignment of the non-dialogue audio from the alternate audio soundtrack with the non-dialogue audio from the original language audio soundtrack.

36 Claims, 5 Drawing Sheets

(51) Int. Cl.
*G10L 21/0272* (2013.01)
*G06F 16/783* (2019.01)

(58) Field of Classification Search
USPC .............................. 386/201; 725/14; 381/316
See application file for complete search history.

(56) References Cited

U.S. PATENT DOCUMENTS

| | | | |
|---|---|---|---|
| 5,712,950 | A | 1/1998 | Cookson et al. |
| 6,417,910 | B1 | 7/2002 | Mead |
| 7,512,886 | B1 | 3/2009 | Herberger et al. |
| 7,692,724 | B2 | 4/2010 | Arora et al. |
| 8,549,569 | B2 * | 10/2013 | Casagrande ............. H04N 5/04 |
| | | | 348/500 |
| 8,850,500 | B2 | 9/2014 | Casagrande et al. |
| 9,111,580 | B2 | 8/2015 | Kirsch |
| 2004/0027496 | A1 | 2/2004 | Morales |
| 2007/0016866 | A1 | 1/2007 | Sporer et al. |
| 2007/0244700 | A1 | 10/2007 | Kahn et al. |
| 2008/0219641 | A1 | 9/2008 | Sandrew et al. |
| 2010/0299131 | A1 | 11/2010 | Gavalda et al. |
| 2011/0097693 | A1 | 4/2011 | Crawford |
| 2011/0258211 | A1 | 10/2011 | Kalisky et al. |
| 2013/0322671 | A1 * | 12/2013 | Alexander ........... H04R 25/407 |
| | | | 381/316 |
| 2015/0310869 | A1 | 10/2015 | Ojanpera et al. |

OTHER PUBLICATIONS

Pettarin, "aeneas," ReadBeyond, Mar. 5, 2017, viewed at https://www.readbeyond.it/aeneas/ (6 pages).
Tsiartas et al., "Bilingual Audio-Subtitle Extraction Using Automatic Segmentation of Movie Audio," IEEE, 2011, pp. 5624-5627.
Unknown, "MyLingo", Website, 2016, viewed at http://www.mylingoapp.com/howitworks.html (1 page).
Villa Real et al., "Dynamic Adjustment of Subtitles Using Audio Fingerprints," Conference Paper, Oct. 2015, pp. 975-978.
Wang, "Speech segmentation without speech recognition," IEEE, Aug. 18, 2033, pp. [insert page number].
Brown, "3 tips for lining up untimed voice-over audio translations to video," May 18, 2017, viewed at https://www.jbistudios.com/blog/3-tips-for-lining-up-untimed-voiceover-audio-translations-to-video (10 pages).

* cited by examiner

ALIGNMENT OF ALTERNATE DIALOGUE AUDIO TRACK TO FRAMES IN A MULTIMEDIA PRODUCTION USING BACKGROUND AUDIO MATCHING

CROSS REFERENCE TO RELATED APPLICATIONS

This application claims the benefit of priority pursuant to 35 U.S.C. § 119(e) of U.S. Provisional Application No. 62/654,308 filed 6 Apr. 2018 and entitled "Alignment of alternate dialogue audio track to frames in a multimedia production using background audio matching," which is hereby incorporated herein by reference in its entirety.

TECHNICAL FIELD

The technology described herein relates to identifying similar sound signatures in media files from disparate sources, and specifically to aligning alternate audio tracks with common video frames.

BACKGROUND

There are several different origins of audio in multimedia productions, such as film or video. For example, a film's soundtrack may include dialogue, Foley (i.e., reproductions of everyday/background sounds), sound effects, and music. Foley, sound effects, and music are part of the background audio in a film. Such background audio may play alongside dialogue or it may be used to fill in silences.

Many older, archived films have a single audio soundtrack for all audio in the film. For example, dialogue, Foley, sound effects, and music may all be merged onto one audio track. This is due to the fact that older film technology was only capable of producing and playing a single sound track.

Modern film soundtracks are often made up of layers of several different audio tracks. For example, there may be a separate audio track for each of the dialogue, Foley, sound effects, and music. There are several reasons for keeping the audio tracks separate. As one example, different audio tracks allow a sound mixer to manipulate the different types of audio separately. As another example, different audio tracks make it easier to alter one audio track, for example by dubbing over the audio with alternate audio, without impacting the rest of the audio.

Regardless of the number of audio tracks in the soundtrack, it is important for the entire soundtrack to align with the correct frames of the film. The soundtrack is aligned with the film such that any dialogue matches with the actors' mouth movements and the Foley and sound effects line up with the actions in the film. It is also important for any music to line up with appropriate scenes and edits in a film to provide artistic effect.

Audio dubbing is a post-production process that allows additional or supplemental audio to either be added to or replace original production audio. This process is commonly used to translate a film into a foreign language to create a foreign language version of the original film. Foreign language dubbing replaces the dialogue audio in the original soundtrack with dialogue audio in a foreign language. In some cases, an archived film may be remastered and may require foreign language dubbing to make one or more foreign language versions. In this case, the dialogue may be part of a single mixed audio track, requiring dubbing over portions of the mixed audio track containing dialogue. In other cases, a modern media presentation may require foreign language dubbing. In this case, the dialogue may be available on a separate audio track recorded before mixing such that it can be replaced without altering the other audio tracks.

In order to retain the realistic and artistic integrity of the film, it is important that the soundtrack stay aligned with the film when a foreign language version is made. In the case of foreign language dubbing, the foreign language dialogue is matched to the actors' mouth movements based on its alignment with the original dialogue of the film.

Current foreign language dubbing processes often require that a foreign language audio track first be translated into the original language of the film. The translated audio track may then be compared to the original language audio track and manually aligned so that the translated audio track aligns with the film frames.

This process of creating a foreign language version of a film is tedious and time-consuming. Further, there may be alignment issues due to the manual alignment process based upon the translation. There is a need for a more efficient and accurate process of creating foreign language versions of films. Specifically, there is a need for an easier method to align foreign language audio with the original film.

The information included in this Background section of the specification, including any references cited herein and any description or discussion thereof, is included for technical reference purposes only and is not to be regarded subject matter by which the scope of the invention as defined in the claims is to be bound.

SUMMARY

In one exemplary implementation, a computer-implemented audio alignment system includes a storage device and a processor. The storage device is configured to ingest and store one or more video files thereon. The one or more video files include one or more respective audio soundtracks. The processor is configured with instructions to receive an alternate audio file associated with a video file of the one or more video file. The alternate audio file includes an audio soundtrack with dialogue and non-dialogue audio. The video file includes a film and an original language audio soundtrack. The original language audio soundtrack comprises dialogue and non-dialogue audio. The processor aligns the non-dialogue audio from the alternate audio soundtrack with the non-dialogue audio from the original language audio soundtrack. The processor further aligns the alternate audio soundtrack with the film based on the alignment of the non-dialogue audio from the alternate audio soundtrack with the non-dialogue audio from the original language audio soundtrack.

In another exemplary implementation, a method is implemented on a computer system for aligning audio soundtracks. A processor in the computer system is particularly configured to perform a number of processing steps. An original language film with an original language audio soundtrack is received at the processor. The original language soundtrack comprises dialogue and background audio. An alternate audio soundtrack associated with the original language film is also received at the processor. The alternate audio soundtrack includes dialogue and background audio. The processor filters the dialogue from the original language audio soundtrack and from the alternate audio soundtrack. The processor aligns the background audio from the alternate audio soundtrack with the background audio from the original language audio soundtrack. The processor further aligns the alternate audio soundtrack with the original language film based on the alignment of the background audio from the alternate audio soundtrack with the background audio from the original language audio soundtrack.

In a further exemplary implementation, a non-transitory computer readable storage medium contains instructions for instantiating a special purpose computer to align audio soundtracks. The instructions implement a computer process to receive an original language film with an original language audio soundtrack in the computer system. The original language audio soundtrack comprises dialogue and background audio. The instructions further configures the computer system to receive an alternate soundtrack associated with the original language film. The alternate soundtrack comprises dialogue and background audio. The instructions cause the computer system to filter the dialogue from the original language audio soundtrack and the alternate soundtrack. The instructions further direct the computer system to determine matching sound signatures from the filtered original language audio soundtrack and the filtered alternate soundtrack. The instructions further direct the computer system to align the background audio from the alternate audio soundtrack with the background audio from the original language soundtrack.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

DETAILED DESCRIPTION

This disclosure is related to identifying sound signatures between disparate sources. In an exemplary embodiment the methods disclosed herein may be used to align alternate dialogue audio with a master print of a multimedia production, such as film or video. For the purposes of this disclosure, film and video may be interchangeable. In several embodiments, alternate dialogue audio, such as dialogue from automated dialogue replacement (ADR) or foreign language dialogue for a foreign language version, is aligned with original dialogue audio from the multimedia production. The alternate dialogue audio may be part of a larger alternate soundtrack including other non-dialogue audio that matches the non-dialogue audio from the original multimedia production soundtrack. In these embodiments, in order to properly align the alternate dialogue soundtrack with the proper video frames in the multimedia production, the dialogue audio from both the alternate soundtrack and the original soundtrack may be ignored, while the remaining non-dialogue audio may be compared. For example, for film or a television show, the remaining non-dialogue audio may be Foley, sound effects, and music, making up the background audio of the film or TV show.

In several embodiments, the alternate soundtrack may be initially aligned with the original soundtrack based on similarities between one or more background audio elements of each soundtrack. In several embodiments, background audio elements may be assessed to identify sound signatures, which may be used to test for alignment accuracy. Sound signatures may be any feature of an audio signal that make the signal unique and distinguish the signal from other signals in the audio soundtrack. For example, a door slam, a car crash, an explosion, etc. may have unique sound signatures that allow for such sound effects to be easily located and targeted in an audio soundtrack. In some embodiments, sound signatures identified in an original audio soundtrack are matched with identical or nearly identical sound signatures identified in the alternate audio soundtrack to assess the alignment of the two audio soundtracks. In several embodiments, confidence scores may be created based on the alignment of sound signatures. For example, confidence scores (e.g., 80%, 90%, 95%, or 99%) may be used to verify the accuracy in the alignment of the soundtracks. Once the alternate and original non-dialogue audio elements are aligned, the alternate soundtrack may be aligned with the original multimedia production based on the alignment of the original soundtrack with the original multimedia production.

In one embodiment, the non-dialogue audio elements may be distinct non-dialogue audio tracks, such as may be the case in soundtracks of modern films. In this embodiment, one or more of the audio tracks making up the background audio in the alternate soundtrack are compared to one or more respective audio tracks in the background audio of the original soundtrack.

In another embodiment, the non-dialogue audio elements may be distinct non-dialogue audio signals within the same audio track, such as may be the case for archived older films. For example, the sound effects may create a distinct audio signal from the musical score, but both may be recorded on the same audio track. In this example, the same distinct audio signals may be compared between the alternate soundtrack and the original soundtrack. For example, sound effects in the alternate soundtrack may be compared to sound effects in the original soundtrack, while music in the alternate soundtrack may be compared to music in the original soundtrack.

Figure 1:
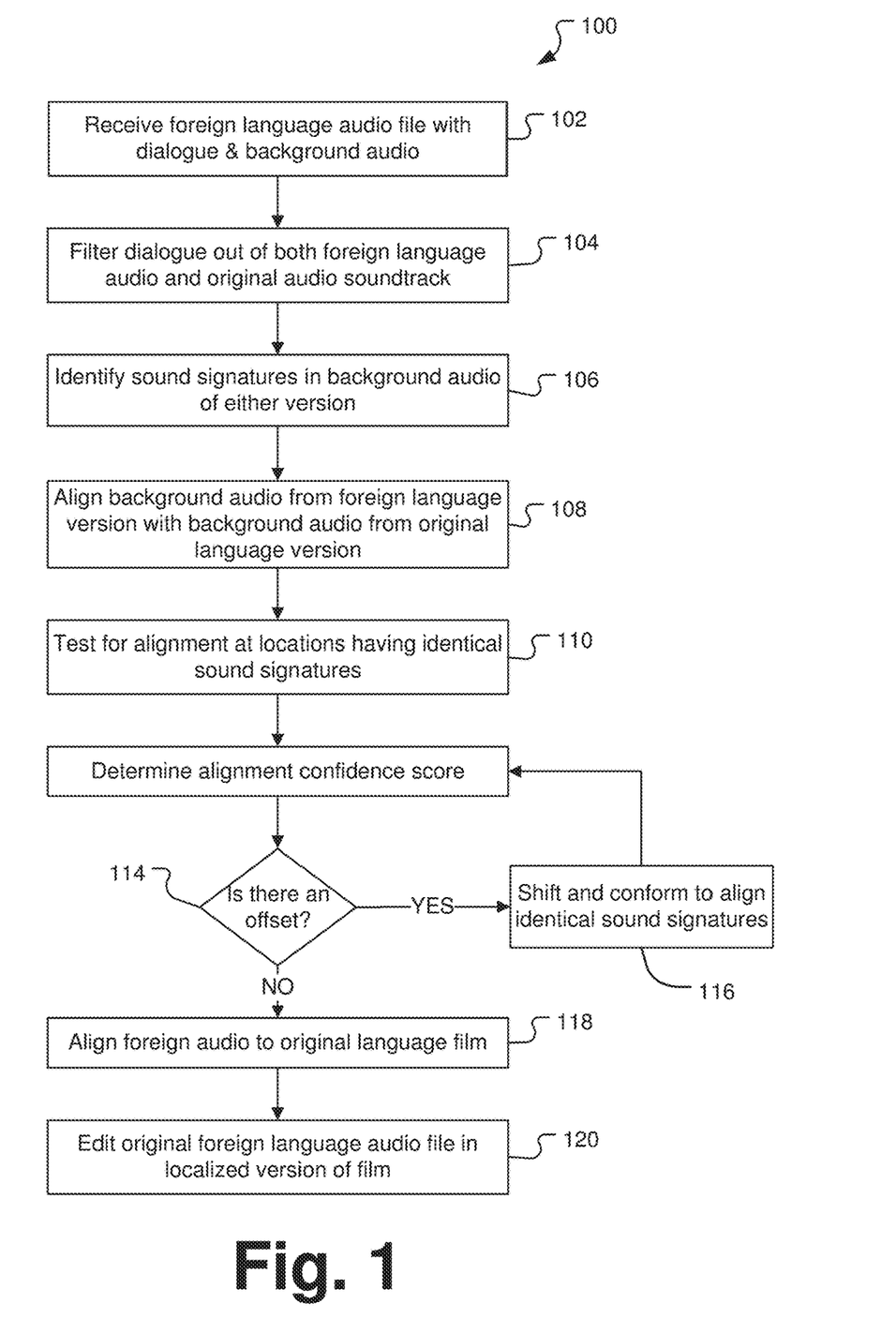
FIG. 1 is a flow chart illustrating a method of aligning foreign language audio with an original language film.

Turning now to the figures, a method of the present disclosure will be discussed in more detail. FIG. 1 is a flow chart illustrating a method of aligning alternate audio, in this case, foreign language audio, with an original language film. The method 100 begins with operation 102 where a foreign language audio file or soundtrack for a particular film is received. In one embodiment, the foreign language audio file contains both dialogue and background audio. Background audio may be any audio that is not dialogue. For example, background audio may include one or more of Foley, sound effects, and music. In some embodiments, the dialogue may be on a separate audio track than the background audio. The background audio may also have different audio tracks for each type of background audio, such as a different audio track for Foley, for sound effects, and for music. In other embodiments, the dialogue may be on the same audio track as the background audio. For example, older archived films may have a single audio track.

After operation 102, the method 100 proceeds to operation 104 and any dialogue in the foreign language audio soundtrack and the original audio soundtrack may be filtered out. To remove or diminish the dialogue components of an audio track, the dialogue may be masked or filtered using a bandpass filter, or the like. In one embodiment, the foreign language audio soundtrack may be made up of separate audio tracks, including a separate audio track for dialogue. In this case, for example, the dialogue audio track may be temporarily removed or masked in its entirety. In another embodiment, the foreign language audio soundtrack may be a single audio track with both dialogue and background audio. In this case, for example, the dialogue may be masked or ignored. For example, the dialogue may be identified within the single audio track based on its frequency range. Dialogue typically has a lower frequency range than Foley and sound effects, such that any audio signals within a certain low-range or mid-range frequency (e.g., typically considered 85 Hz-255 Hz for human speech) may be identified as dialogue and masked or filtered.

After operation 104, the method 100 proceeds to operation 106 and sound signatures may be identified in the background audio of the foreign language audio soundtrack, the original soundtrack, or both. Sound signatures may be any features of the audio soundtracks that are unique or distinct from the surrounding audio features. For example, sound signatures may have distinctly higher frequencies and amplitudes, shorter wavelengths, or the like or any combination of unique sound wave features. For example, feature films may have soaring music soundtracks, action movies may have screeching tires and explosions, science fiction movies may have laser blasts, etc. Often these sounds appear in the soundtrack in the absence of dialogue and can be unique sound signatures that, when in combination with other sound signatures at different times in the film, can thus help provide instances for alignment of the audio tracks.

In one embodiment, sound signatures may be identified within the foreign language audio soundtrack. In this embodiment, once sound signatures are identified within the foreign language audio soundtrack, the original soundtrack may be scanned to identify audio signals with similar features to the foreign language audio sound signatures. For example, if the foreign language audio soundtrack and the original soundtrack were initially aligned, the scanning may focus on portions of the original soundtrack that are within a proximate area of the foreign language audio sound signatures.

In another embodiment, sound signatures may be identified within the original soundtrack. In this embodiment, once sound signatures are identified within the original soundtrack, the foreign language audio soundtrack may be scanned to identify audio signals with similar features to the original soundtrack sound signatures. For example, if the original soundtrack and the foreign language audio soundtrack were initially aligned, the scanning may focus on portions of the foreign language audio soundtrack that are within a proximate area of the original soundtrack sound signatures. In yet another embodiment, sound signatures may be identified within both the foreign language audio soundtrack and the original soundtrack.

After operation 106, the method 100 proceeds to operation 108 and background audio from the foreign language audio soundtrack may be aligned with background audio from the original audio soundtrack. It is contemplated that this initial alignment step may be performed in numerous ways. For example, audio signals may be aligned based on similarities in signal features, such as frequency, amplitude, shape, and the like. In one embodiment, the foreign language audio soundtrack may have multiple background audio tracks that each need to be aligned with respective background audio tracks in the original soundtrack. For example, a sound effects audio track from the foreign language audio soundtrack may be aligned or matched with a sound effects audio track from the original soundtrack, as they should be identical or nearly identical. In the same manner, Foley audio tracks may be aligned and music audio tracks may be aligned. In another embodiment, the foreign language audio soundtrack may be a single audio track with various types of background audio included. In this case, the single audio track may be aligned with the single audio track of the original soundtrack in the manner described above.

After operation 108, the method 100 proceeds to operation 110 and alignment may be tested at locations having matching sound signatures. For example, the locations of matching sound signatures may be assessed to determine whether identical sound signatures are positioned at the same location within both the foreign language audio soundtrack and the original soundtrack. In the embodiment where sound signatures are only identified within the foreign language audio soundtrack, the alignment assessment determines whether the foreign language audio sound signatures align with audio signals having similar features within the original soundtrack. In the embodiment where sound signatures are only identified within the original soundtrack, the alignment assessment determines whether the original soundtrack sound signatures align with audio signals having similar features within the foreign language audio soundtrack. In the embodiment where sound signatures are identified within both the foreign language audio soundtrack and the original soundtrack, the alignment assessment determines whether matching sound signatures are located in the same position within both the foreign language audio soundtrack and the original soundtrack.

After operation 110, the method 100 proceeds to operation 112 and the confidence score of the alignment of the foreign language audio soundtrack with the original soundtrack may be determined. A low confidence score indicates a lack of alignment, or an offset, between the two audio soundtracks, while a high confidence score (e.g., 90%) indicates a high degree of alignment with little to no offset between the two audio soundtracks.

After operation 112, the method 100 proceeds to operation 114 and it may be determined whether there is an offset between the foreign language audio soundtrack and the original soundtrack. If it is determined that there is an offset between the two audio soundtracks, then the method 100 proceeds to operation 116 and the audio soundtracks are shifted and conformed to align identical sound signatures or to align sound signatures from one audio soundtrack with audio signals having similar signal features in the other audio soundtrack. After operation 116, the method 100 proceeds back to operation 112 and the confidence level of the alignment of the foreign language audio soundtrack with the original soundtrack is again determined.

If it is determined at operation 114 that there is no offset, then the method 100 proceeds to operation 118 and the foreign language audio soundtrack may be aligned to the original language film based upon the identity between sound signatures in the two audio soundtracks. The original language soundtrack is already aligned with the appropriate frames in the original language film. Thus, once the foreign language audio soundtrack is properly aligned with the original soundtrack, the foreign language audio soundtrack is also aligned with the appropriate frames in the original language film.

After operation 118, the method 100 proceeds to operation 120 and the original foreign language audio soundtrack can now be edited into the multimedia presentation in proper alignment with the video frames based upon the identity of the audio soundtracks and alignment steps noted above.

Figure 2:
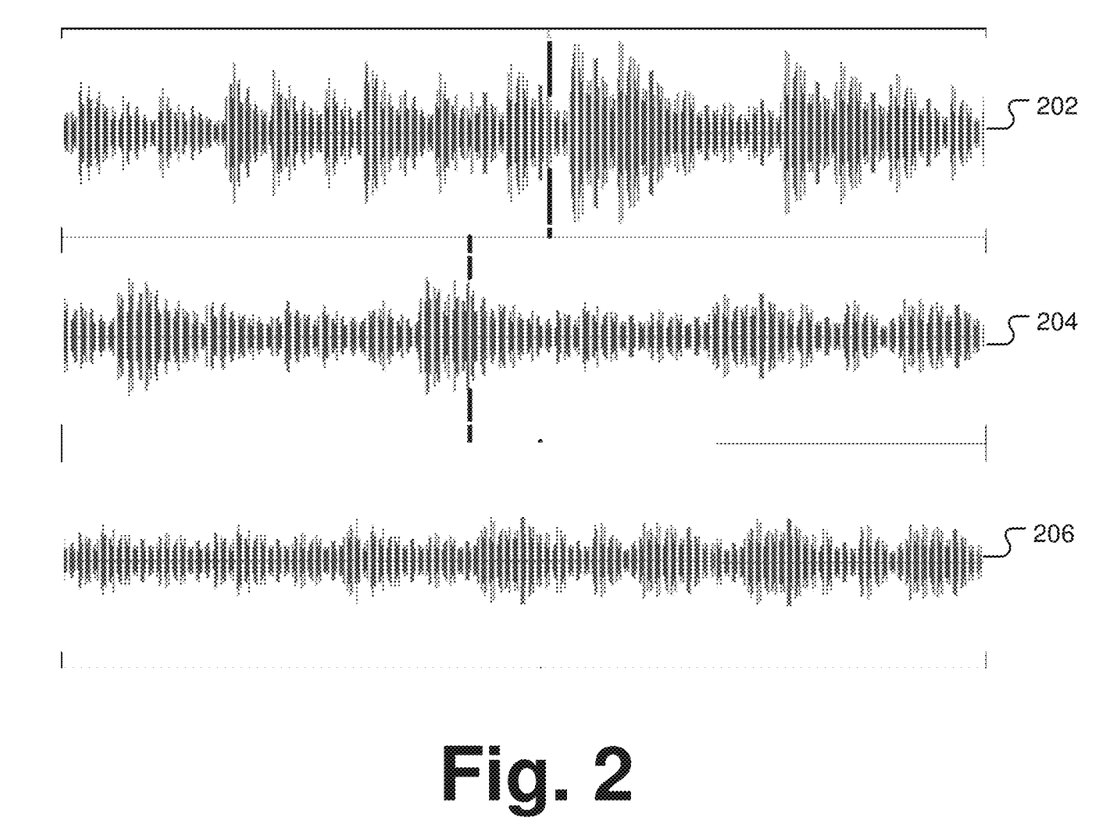
FIG. 2 is a picture diagram illustrating a foreign language audio file with several audio tracks, including dialogue and background audio.

FIG. 2 is a picture diagram illustrating a foreign language audio file with several audio tracks, including dialogue and background audio. As shown in FIG. 2, there are three separate audio tracks: a music audio track 202, a sound effects audio track 204, and a dialogue audio track 206. However, it is contemplated that there may be several different audio tracks. When the audio tracks are layered, as shown in FIG. 2, the tracks may be played together creating a seamless audio soundtrack with dialogue, music, and sound effects. Because the dialogue, music, and sound effects are located on different audio tracks 206, 204, 202, they may be manipulated separately, or a single audio track may be removed, without affecting the other audio tracks.

Figure 3:
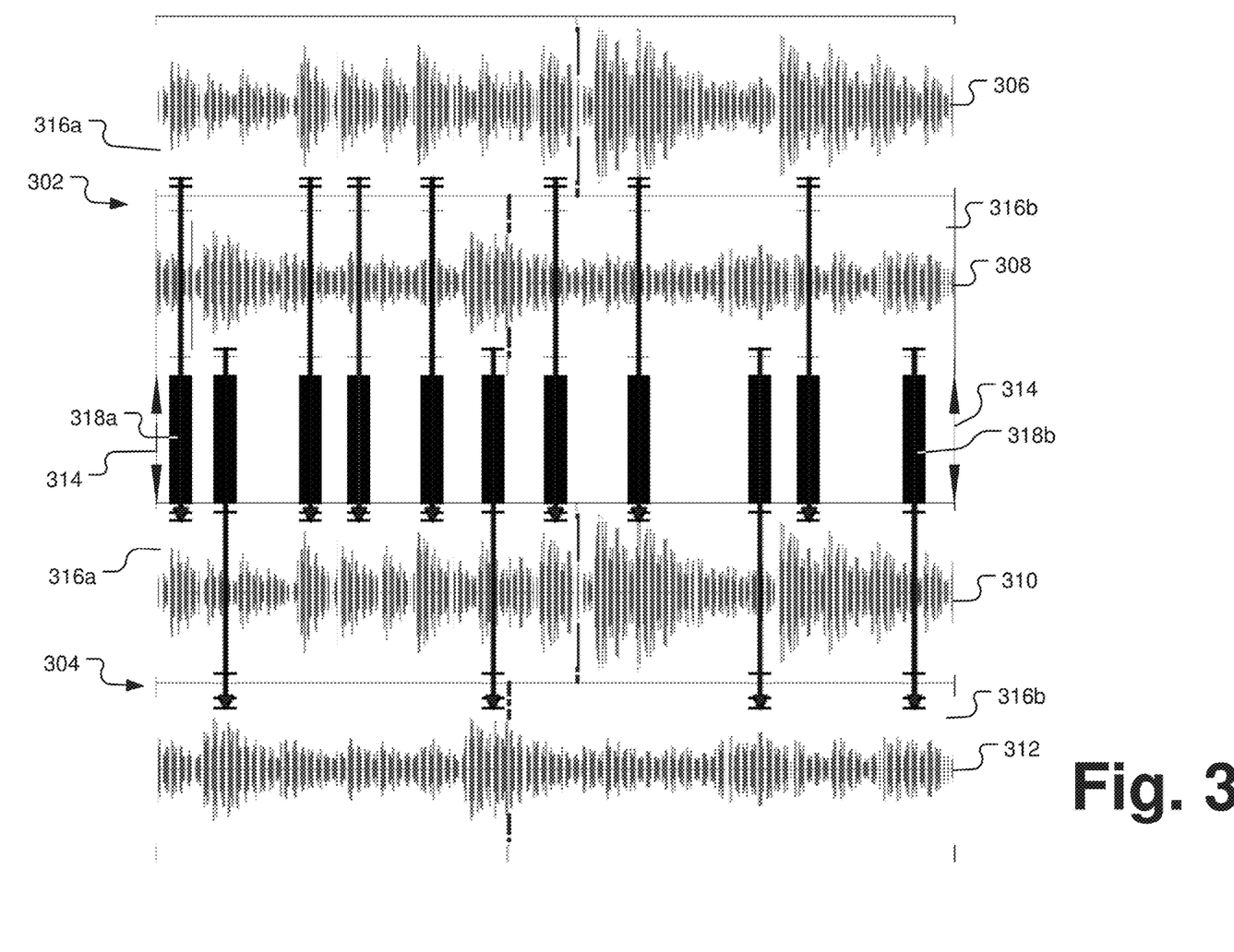
FIG. 3 is a picture diagram illustrating a method of aligning background audio from a foreign language audio file with background audio from the original language film with audio soundtracks containing multiple audio tracks.

FIG. 3 is a picture diagram illustrating a method of aligning background audio from a foreign language audio file with background audio from the associated original language film with audio soundtracks containing multiple audio tracks. FIG. 3 shows background audio 302 from a foreign language audio file containing both a music audio track 306 and a sound effects audio track 308. Also depicted is background audio 304 from the original soundtrack from which the foreign language audio is based, which also contains a music audio track 310 and a sound effects audio track 312. In the embodiment shown in FIG. 3, the dialogue audio tracks for both the foreign language audio file and the original soundtrack have been removed, leaving the music audio tracks 306, 310 and the sound effects audio tracks 308, 312 for comparison.

In the embodiment shown in FIG. 3, sound signatures 316a, 316b are identified within each audio track 306, 308, 310, 312 of each background audio track 302, 304. For example, sound signatures 316a, 316b may be identified where there are amplitude spikes in the audio track. For example, the sound signatures 316a identified on the music audio tracks 306, 310 may be loud or distinct instrumental sounds, such as those produced from a bass, drum, gong, or cymbal. As another example, the sound signatures 316b identified on the sound effects audio tracks 308, 312 may be loud or distinct effects, such as, for example, a door slam, a car crash, or an explosion. The sound signatures 316a on the music audio tracks 306, 310 may be compared 318a and the sound signatures 316b on the sound effects audio tracks 308, 312 may be compared 318b to test for alignment. FIG. 3 shows the background audio 302 and 304 are aligned, as each sound signature 316a on the music audio track 306 aligns with each sound signature 316a on the music audio track 310, and each sound signature 316b on the sound effects audio track 308 aligns with each sound signature 316b on the sound effects audio track 312. In this example, the straight vertical arrows 318a, 318b show the alignment of sound signatures. When multiple sound signatures 316a, 316b are found in alignment within an extended segment of audio 314, there is a higher likelihood and confidence that there is alignment within the entire audio track. If multiple sound signatures in multiple extended segments are found in alignment, the confidence value of alignment if the entire audio tracks is very high.

Figure 4:
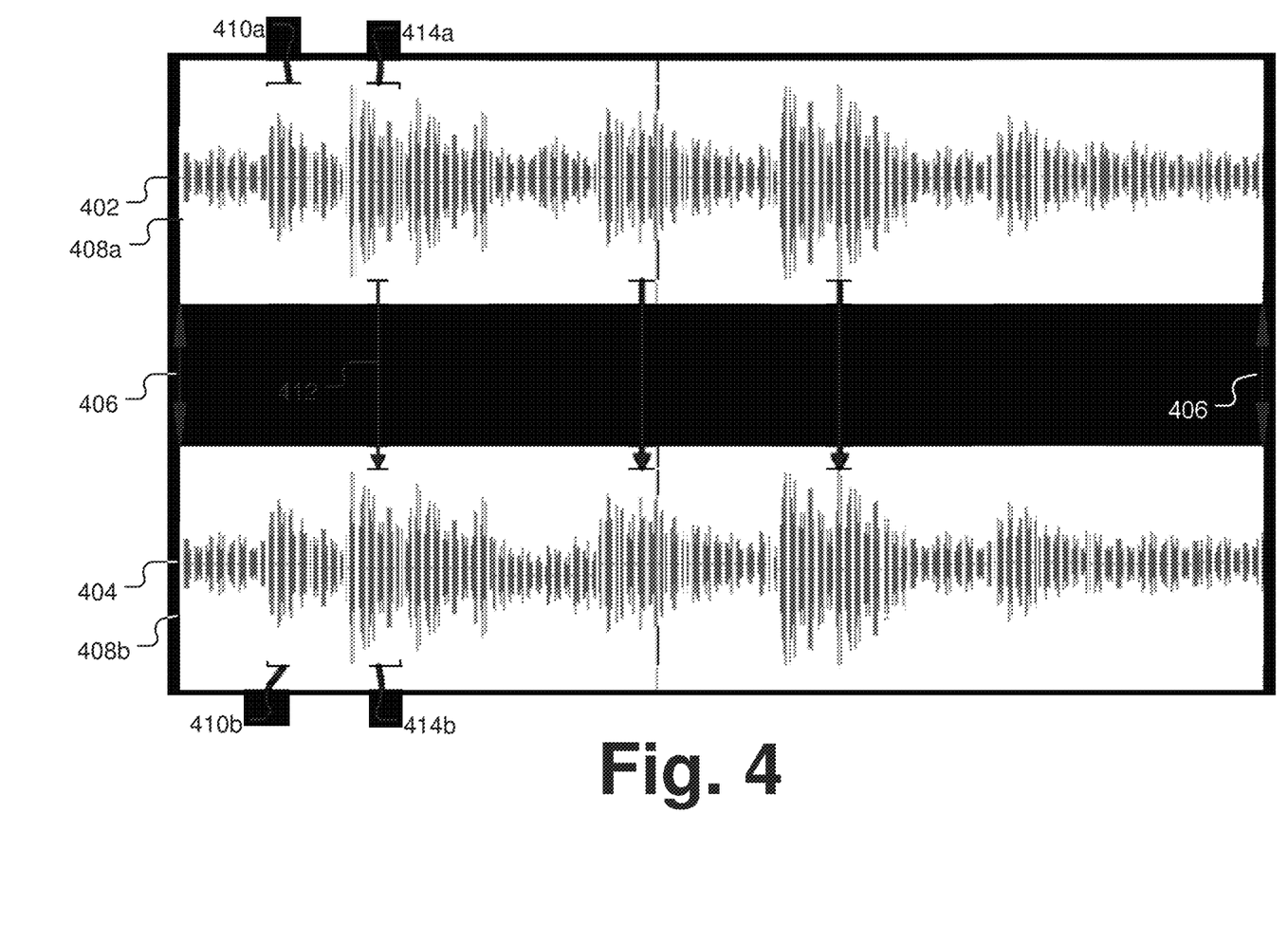
FIG. 4 is a picture diagram illustrating a method of aligning background audio from a foreign language audio file with background audio from the original language film with audio soundtracks having a single audio track.

FIG. 4 is a picture diagram illustrating a method of aligning background audio from a foreign language audio file with background audio from the original language film with audio soundtracks having a single audio track. FIG. 4 shows a single audio track 402 from a foreign language audio file, containing both dialogue and background audio. Also depicted is a single audio track 404 from the original soundtrack from which the foreign language audio is based, which also contains both dialogue and background audio. In the embodiment shown in FIG. 4, the dialogue 408a, 408b is identified in the audio tracks 402, 404 based on its mid-range frequency and low amplitude. Once the dialogue 408a, 408b is identified, it can be masked or ignored. The higher range frequencies and amplitudes in the audio tracks 402, 404 may be identified as background audio 410a, 410b, and may be used in the alignment process.

Sound signatures 414a, 414b may be identified within the background audio sections 410a, 410b. The sound signatures 414a, 414b may be used to test for alignment of audio track 402 with audio track 404. In the example shown in FIG. 4, the audio track 402 from the foreign language audio file is aligned with the audio track 404 from the original soundtrack, as each sound signature 414a in the background audio 410a of the foreign language audio track 402 aligns with each sound signature 414b in the background audio 410b of the original soundtrack 404. In this example, the straight vertical arrows 412 show the alignment of sound signatures 414a, 414b within the background audio 410a, 410b. When multiple sound signatures 410a, 410b, 414a, 414b are found in alignment within an extended segment of audio 406, there is a higher likelihood and confidence that there is alignment within the entire audio track. If multiple sound signatures in multiple extended segments are found in alignment, the confidence value of alignment if the entire audio tracks is very high.

Figure 5:
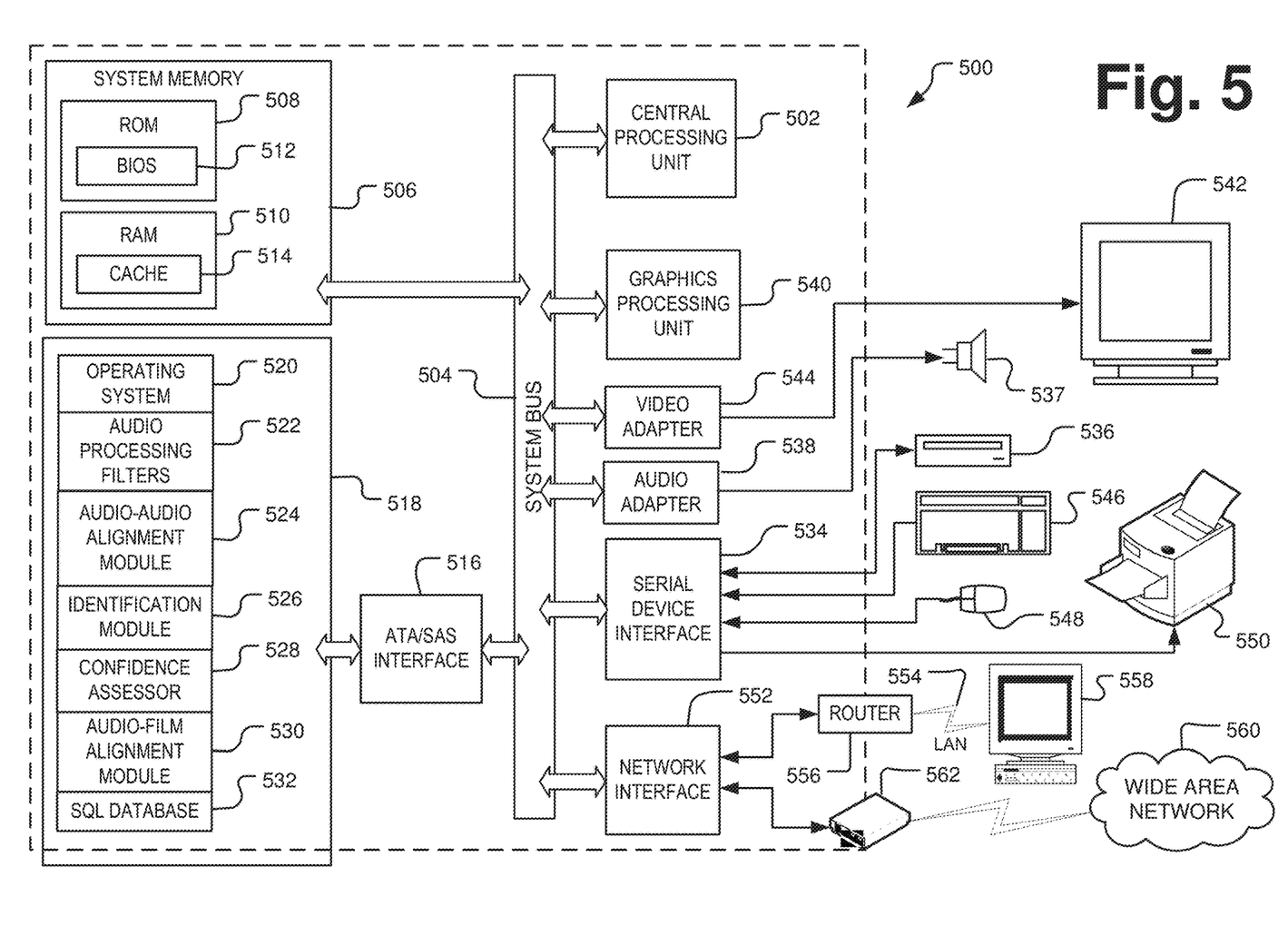
FIG. 5 is a schematic diagram of an exemplary computer system for processing and aligning audio tracks as described herein.

An exemplary computer-implemented audio processing and alignment system 500 for implementing the audio processing and alignment processes above is depicted in FIG. 5. The audio processing and alignment system 500 may be embodied in a specifically configured, high-performance computing system including a cluster of computing devices in order to provide a desired level of computing power and processing speed. Alternatively, the process described herein could be implemented on a computer server, a mainframe computer, a distributed computer, a personal computer (PC), a workstation connected to a central computer or server, a notebook or portable computer, a tablet PC, a smart phone device, an Internet appliance, or other computer devices, or combinations thereof, with internal processing and memory components as well as interface components for connection with external input, output, storage, network, and other types of peripheral devices. Internal components of the media classifying system 500 in FIG. 5 are shown within the dashed line and external components are shown outside of the dashed line. Components that may be internal or external are shown straddling the dashed line.

In any embodiment or component of the system described herein, the audio processing and alignment system 500 includes one or more processors 502 and a system memory 506 connected by a system bus 504 that also operatively couples various system components. There may be one or more processors 502, e.g., a single central processing unit (CPU), or a plurality of processing units, commonly referred to as a parallel processing environment (for example, a dual-core, quad-core, or other multi-core processing device). In addition to the CPU, the audio processing and alignment system 500 may also include one or more graphics processing units (GPU) 540. A GPU 540 is specifically designed for rendering video and graphics for output on a monitor. A GPU 540 may also be helpful for handling video processing functions even without outputting an image to a monitor. By using separate processors for system and graphics processing, computers are able to handle video and graphic-intensive applications more efficiently. As noted, the system may link a number of processors together from different machines in a distributed fashion in order to provide the necessary processing power or data storage capacity and access.

The system bus 504 may be any of several types of bus structures including a memory bus or memory controller, a peripheral bus, a switched-fabric, point-to-point connection, and a local bus using any of a variety of bus architectures. The system memory 506 includes read only memory (ROM) 508 and random access memory (RAM) 510. A basic input/output system (BIOS) 512, containing the basic routines that help to transfer information between elements within the computer system 500, such as during start-up, is stored in ROM 508. A cache 514 may be set aside in RAM 510 to provide a high speed memory store for frequently accessed data.

A data storage device 518 for nonvolatile storage of applications, files, and data may be connected with the system bus 504 via a device attachment interface 516, e.g., a Small Computer System Interface (SCSI), a Serial Attached SCSI (SAS) interface, or a Serial AT Attachment (SATA) interface, to provide read and write access to the data storage device 518 initiated by other components or applications within the audio processing and alignment system 500. The data storage device 518 may be in the form of a hard disk drive or a solid state memory drive or any other memory system. A number of program modules and other data may be stored on the data storage device 518, including an operating system 520, one or more application programs, and data files. In an exemplary implementation, the data storage device 518 may store various audio processing filters 522, an audio-to-audio alignment module 524, an identification module 526, a confidence assessor 528, an audio-to-film alignment module 530, as well as the media and audio files being processed and any other programs, functions, filters, and algorithms necessary to implement the audio processing and alignment procedures described herein. The data storage device 518 may also host a database 532 (e.g., a SQL database) for storage of video frame time stamps, sound signature detection algorithms, dialogue detection algorithms, identified sound signatures, confidence algorithms, media data, and other relational data necessary to perform the audio processing and alignment procedures described herein. Note that the data storage device 518 may be either an internal component or an external component of the computer system 500 as indicated by the hard disk drive 518 straddling the dashed line in FIG. 5.

In some configurations, the audio processing and alignment system 500 may include both an internal data storage device 518 and one or more external data storage devices 536, for example, a CD-ROM/DVD drive, a hard disk drive, a solid state memory drive, a magnetic disk drive, a tape storage system, and/or other storage system or devices. The external storage devices 536 may be connected with the system bus 504 via a serial device interface 534, for example, a universal serial bus (USB) interface, a SCSI interface, a SAS interface, a SATA interface, or other wired or wireless connection (e.g., Ethernet, Bluetooth, 802.11, etc.) to provide read and write access to the external storage devices 536 initiated by other components or applications within the audio processing and alignment system 500. The external storage device 536 may accept associated computer-readable media to provide input, output, and nonvolatile storage of computer-readable instructions, data structures, program modules, and other data for the audio processing and alignment system 500.

A display device 542, e.g., a monitor, a television, or a projector, or other type of presentation device may also be connected to the system bus 504 via an interface, such as a video adapter 540 or video card. Similarly, audio devices, for example, external speakers, headphones, or a microphone (not shown), may be connected to the system bus 504 through an audio card or other audio interface 538 for presenting audio associated with the media files.

In addition to the display device 542 and audio device 547, the audio processing and alignment system 500 may include other peripheral input and output devices, which are often connected to the processor 502 and memory 506 through the serial device interface 544 that is coupled to the system bus 506. Input and output devices may also or alternately be connected with the system bus 504 by other interfaces, for example, a universal serial bus (USB), an IEEE 1494 interface ("Firewire"), a parallel port, or a game port. A user may enter commands and information into the audio processing and alignment system 500 through various input devices including, for example, a keyboard 546 and pointing device 548, for example, a computer mouse. Other input devices (not shown) may include, for example, a joystick, a game pad, a tablet, a touch screen device, a satellite dish, a scanner, a facsimile machine, a microphone, a digital camera, and a digital video camera.

Output devices may include a printer 550. Other output devices (not shown) may include, for example, a plotter, a photocopier, a photo printer, a facsimile machine, and a printing press. In some implementations, several of these input and output devices may be combined into single devices, for example, a printer/scanner/fax/photocopier. It should also be appreciated that other types of computer-readable media and associated drives for storing data, for example, magnetic cassettes or flash memory drives, may be accessed by the computer system 500 via the serial port interface 544 (e.g., USB) or similar port interface. In some implementations, an audio device such as a loudspeaker may be connected via the serial device interface 534 rather than through a separate audio interface.

The audio processing and alignment system 500 may operate in a networked environment using logical connections through a network interface 552 coupled with the system bus 504 to communicate with one or more remote devices. The logical connections depicted in FIG. 5 include a local-area network (LAN) 554 and a wide-area network (WAN) 560. Such networking environments are commonplace in home networks, office networks, enterprise-wide computer networks, and intranets. These logical connections may be achieved by a communication device coupled to or integral with the audio processing and alignment system 500. As depicted in FIG. 5, the LAN 554 may use a router 556 or hub, either wired or wireless, internal or external, to connect with remote devices, e.g., a remote computer 558, similarly connected on the LAN 554. The remote computer 558 may be another personal computer, a server, a client, a peer device, or other common network node, and typically includes many or all of the elements described above relative to the computer system 500.

To connect with a WAN 560, the audio processing and alignment system 500 typically includes a modem 562 for establishing communications over the WAN 560. Typically the WAN 560 may be the Internet. However, in some instances the WAN 560 may be a large private network spread among multiple locations, or a virtual private network (VPN). The modem 562 may be a telephone modem, a high speed modem (e.g., a digital subscriber line (DSL) modem), a cable modem, or similar type of communications device. The modem 562, which may be internal or external, is connected to the system bus 518 via the network interface 552. In alternate embodiments the modem 562 may be connected via the serial port interface 544. It should be appreciated that the network connections shown are exemplary and other means of and communications devices for establishing a network communications link between the computer system and other devices or networks may be used.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A computer-implemented audio alignment system comprising
   a data storage device configured to ingest and store one or more video files thereon, wherein the one or more video files comprise one or more respective audio soundtracks; and
   one or more processors configured with instructions to
      receive an alternate audio file associated with a video file of the one or more video files, wherein the alternate audio file comprises an alternate audio soundtrack with dialogue audio and non-dialogue audio and the video file comprises a film and an original language audio soundtrack, wherein the original language audio soundtrack comprises dialogue audio and non-dialogue audio;
      filter to remove the dialogue audio from the alternate audio soundtrack and from the original language soundtrack;
      align the non-dialogue audio from the alternate audio soundtrack with the non-dialogue audio from the original language audio soundtrack based on a filtered alternate audio soundtrack and a filtered original language soundtrack; and
      align the alternate audio soundtrack with the film based on the alignment of the non-dialogue audio from the alternate audio soundtrack with the non-dialogue audio from the original language audio soundtrack.

2. The computer-implemented audio alignment system of claim 1, wherein the one or more processors are further configured with instructions to filter the dialogue audio from the alternate audio soundtrack and from the original language soundtrack before aligning the non-dialogue audio from the alternate audio soundtrack with the non-dialogue audio from the original language soundtrack.

3. The computer-implemented audio alignment system of claim 1, wherein the one or more processors are further configured with instructions to
   identify sound signatures in the non-dialogue audio from the alternate audio soundtrack and the non-dialogue audio from the original language audio soundtrack;
   determine matching sound signatures from the non-dialogue audio from the alternate audio soundtrack and the non-dialogue audio from the original language audio soundtrack;
   assess alignment between matching sound signatures to determine if there is an offset between the non-dialogue audio from the alternate audio soundtrack and the non-dialogue audio from the original language audio soundtrack; and
   align the non-dialogue audio from the alternate audio soundtrack with the non-dialogue audio from the original language audio soundtrack when there is an offset.

4. The computer-implemented audio alignment system of claim 3, wherein the alignment assessment comprises determining an alignment confidence score.

5. The computer-implemented audio alignment system of claim 3, wherein the one or more processors are further configured with instructions to
   identify the sound signatures as patterns of spikes in amplitude; or
   identify the sound signatures as unique features of audio signals in each of the alternate audio soundtrack and the original language audio soundtrack that is distinct from other features of each audio signal.

6. The computer-implemented audio alignment system of claim 1, wherein the non-dialogue audio from both the alternate audio soundtrack and the original language audio soundtrack comprises sound effects and music.

7. The computer-implemented audio alignment system of claim 1, wherein the alternate audio soundtrack and the original language soundtrack each comprise two or more separate audio tracks.

8. The computer-implemented audio alignment system of claim 7, wherein the one or more processors are further configured with instructions to remove the dialogue audio track for the alternate audio soundtrack and the dialogue audio track for the original language audio soundtrack before aligning the non-dialogue audio from the alternate audio soundtrack with the non-dialogue audio from the original language audio soundtrack.

9. The computer-implemented audio alignment system of claim 7, wherein the aligning of the non-dialogue audio from the alternate audio soundtrack with the non-dialogue audio from the original language audio soundtrack further comprises aligning a sound effects audio track, a music audio track, or both, from the alternate audio soundtrack with a respective sound effects audio track, a respective music audio track, or both, from the original language audio soundtrack.

10. The computer-implemented audio alignment system of claim 1, wherein the alternate audio soundtrack and the original language audio soundtrack each comprise a single audio track for dialogue, sound effects, and music.

11. The computer-implemented audio alignment system of claim 10, wherein the one or more processors are further configured with instructions to
identify the dialogue audio in both the alternate audio soundtrack and the original language audio soundtrack; and
mask the dialogue audio for both the alternate audio soundtrack and the original language audio soundtrack before aligning the non-dialogue audio from the alternate audio soundtrack with the non-dialogue audio from the original language audio soundtrack.

12. The computer-implemented audio alignment system of claim 11, wherein identifying dialogue audio in both the alternate audio soundtrack and the original language audio soundtrack comprises identifying audio signals in the respective audio soundtracks that are within a mid-range frequency.

13. A method implemented on a computer system for aligning audio soundtracks, wherein one or more processors in the computer system is particularly configured to perform a number of processing steps comprising
receiving an original language film with an original language audio soundtrack, wherein the original language soundtrack comprises dialogue audio and background audio;
receiving an alternate audio soundtrack associated with the original language film, wherein the alternate audio soundtrack comprises dialogue audio and background audio;
filtering to remove the dialogue audio from the alternate audio soundtrack and from the original language soundtrack;
aligning the background audio from the alternate audio soundtrack with the background audio from the original language audio soundtrack based on a filtered alternate audio soundtrack and a filtered original language soundtrack; and
aligning the alternate audio soundtrack with the original language film based on the alignment of the background audio from the alternate audio soundtrack with the background audio from the original language audio soundtrack.

14. The method of claim 13, wherein the one or more processors are configured to perform the processing step of filtering the dialogue audio from the alternate audio soundtrack and from the original language soundtrack before aligning the non-dialogue audio from the alternate audio soundtrack with the non-dialogue audio from the original language soundtrack.

15. The method of claim 13, wherein the one or more processors is further configured to perform additional processing steps comprising
identifying sound signatures in the background audio from the alternate audio soundtrack and in the background audio from the original language audio soundtrack;
determining matching sound signatures from the background audio from the alternate audio soundtrack and from the background audio from the original language audio soundtrack;
assessing alignment between matching sound signatures to determine whether there is an offset between the background audio from the alternate audio soundtrack and the background audio from the original language audio soundtrack; and
aligning the background audio from the alternate audio soundtrack with the background audio from the original language audio soundtrack when there is an offset.

16. The method of claim 15, wherein the step of assessing alignment further comprises calculating a confidence score to determine whether there is an offset.

17. The method of claim 15, wherein the one or more processors are further configured to perform additional processing steps comprising
identifying the sound signatures as patterns of spikes in amplitude; or
identifying the sound signatures as unique features of audio signals in each of the alternate audio soundtrack and the original language audio soundtrack that is distinct from other features of each audio signal.

18. The method of claim 13, wherein the non-dialogue audio from both the alternate audio soundtrack and the original language audio soundtrack comprises sound effects and music.

19. The method of claim 13, wherein the alternate audio soundtrack and the original language soundtrack comprise two or more separate audio tracks.

20. The method of claim 19, wherein the one or more processors are further configured to perform an additional processing step comprising removing the dialogue audio track for the alternate audio soundtrack and the dialogue audio track for the original language audio soundtrack before aligning the non-dialogue audio from the alternate audio soundtrack with the non-dialogue audio from the original language audio soundtrack.

21. The method of claim 19, wherein the step of aligning of the non-dialogue audio from the alternate audio soundtrack with the non-dialogue audio from the original language audio soundtrack further comprises aligning a sound effects audio track, a music audio track, or both, from the alternate audio soundtrack with a respective sound effects audio track, a respective music audio track, or both, from the original language audio soundtrack.

22. The method of claim 13, wherein the alternate audio soundtrack and the original language audio soundtrack each comprise a single audio track for dialogue, sound effects, and music.

23. The method of claim 22, wherein the one or more processors are further configured to perform additional processing steps comprising
identifying the dialogue audio in both the alternate audio soundtrack and the original language audio soundtrack; and
masking the dialogue audio for both the alternate audio soundtrack and the original language audio soundtrack before aligning the non-dialogue audio from the alternate audio soundtrack with the non-dialogue audio from the original language audio soundtrack.

24. The method of claim 22, wherein the step of identifying the dialogue audio in both the alternate audio soundtrack and the original language audio soundtrack further comprises identifying audio signals in the respective audio soundtracks that are within a mid-range frequency.

25. A non-transitory computer readable storage medium containing instructions for instantiating a special purpose computer to align audio soundtracks, wherein the instructions implement a computer process comprising the steps of
receiving an original language film with an original language audio soundtrack, wherein the original language audio soundtrack comprises dialogue audio and background audio;
receiving an alternate soundtrack associated with the original language film, wherein the alternate soundtrack comprises dialogue audio and background audio;
filtering to remove the dialogue audio from the alternate audio soundtrack and from the original language soundtrack;
determining matching sound signatures from a filtered original language audio soundtrack and a filtered alternate soundtrack generated in the filtering step; and
aligning the background audio from the alternate audio soundtrack with the background audio from the original language soundtrack.

26. The non-transitory computer readable storage medium of claim 25, wherein the computer process further comprises filtering the dialogue audio from the alternate audio soundtrack and from the original language soundtrack before aligning the non-dialogue audio from the alternate audio soundtrack with the non-dialogue audio from the original language soundtrack.

27. The non-transitory computer readable storage medium of claim 25, wherein the computer process further comprises
identifying sound signatures in the background audio from the alternate audio soundtrack and in the background audio from the original language soundtrack;
determining matching sound signatures from the background audio from the alternate audio soundtrack and from the background audio from the original language soundtrack;
assessing alignment between matching sound signatures to determine whether there is an offset between the background audio from the alternate audio soundtrack and the background audio from the original language soundtrack; and
aligning the background audio from the alternate audio soundtrack with the background audio from the original language soundtrack when there is an offset.

28. The non-transitory computer readable storage medium of claim 25, wherein the step of assessing alignment further comprises calculating a confidence score to determine whether there is an offset.

29. The non-transitory computer readable storage medium of claim 25, wherein the computer process further comprises
identifying the sound signatures as patterns of spikes in amplitude; or
identifying the sound signatures as unique features of audio signals in each of the alternate audio soundtrack and the original language audio soundtrack that is distinct from other features of each audio signal.

30. The non-transitory computer readable storage medium of claim 25, wherein the non-dialogue audio from both the alternate audio soundtrack and the original language audio soundtrack comprises sound effects and music.

31. The non-transitory computer readable storage medium of claim 25, wherein the alternate audio soundtrack and the original language soundtrack comprise two or more separate audio tracks.

32. The non-transitory computer readable storage medium of claim 31, wherein the computer process further comprises removing the dialogue audio track for the alternate audio soundtrack and the dialogue audio track for the original language audio soundtrack before aligning the non-dialogue audio from the alternate audio soundtrack with the non-dialogue audio from the original language audio soundtrack.

33. The non-transitory computer readable storage medium of claim 31, wherein the step of aligning of the non-dialogue audio from the alternate audio soundtrack with the non-dialogue audio from the original language audio soundtrack further comprises aligning a sound effects audio track, a music audio track, or both, from the alternate audio soundtrack with a respective sound effects audio track, a respective music audio track, or both, from the original language audio soundtrack.

34. The non-transitory computer readable storage medium of claim 25, wherein the alternate audio soundtrack and the original language audio soundtrack each comprise a single audio track for dialogue, sound effects, and music.

35. The non-transitory computer readable storage medium of claim 34, wherein the computer process further comprises
identifying the dialogue audio in both the alternate audio soundtrack and the original language audio soundtrack; and
masking the dialogue audio for both the alternate audio soundtrack and the original language audio soundtrack before aligning the non-dialogue audio from the alternate audio soundtrack with the non-dialogue audio from the original language audio soundtrack.

36. The non-transitory computer readable storage medium of claim 35, wherein the step of identifying the dialogue audio in both the alternate audio soundtrack and the original language audio soundtrack further comprises identifying audio signals in the respective audio soundtracks that are within a mid-range frequency.

* * * * *